Figure 1:
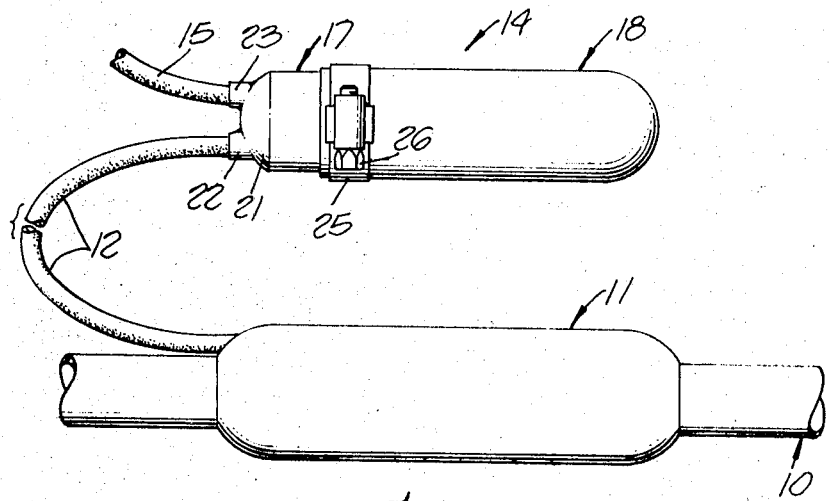

United States Patent

[11] 3,614,295

[72] Inventors George W. Gillemot
2331 20th St., Santa Monica, Calif. 90405;
John T. Thompson, 244 Laring St., Los Angeles, Calif. 90024
[21] Appl. No. 864,065
[22] Filed Oct. 6, 1969
[45] Patented Oct. 19, 1971

[54] CABLE SPLICE KIT AND METHOD OF USE IN MAKING BRANCHOUT SERVICE CONNECTIONS
8 Claims, 2 Drawing Figs.
[52] U.S. Cl. .................................................. 174/87,
156/48, 174/76, 174/93
[51] Int. Cl. ....................................................H02g 15/08,
H01b 13/00
[50] Field of Search........................................... 156/47,
212, 48, 49; 174/72, 76, 87, 93, 21 R

[56] References Cited
UNITED STATES PATENTS
3,209,069 9/1965 Ruddell et al................. 174/76
3,309,456 3/1967 Connell........................ 174/60

Primary Examiner—Benjamin A. Borchelt
Assistant Examiner—H. Tudor
Attorney—Sellers and Brace ABSTRACT: A cable splice kit and method for providing a main distribution cable with service branchouts each including a separate auxiliary splice housing designed to be opened and reclosed while testing and servicing lead-in splicing operations without need for disturbing the main cable branchout splice. The branchout cable includes extra conductors spliced to the conductors of the main cable and available for connection to the lead-in cable when and as need arises. The branchout and service cables have electrical shields which are secured together in an area imbedded in potting compound at one end of the auxiliary splice housing.

PATENTED OCT 19 1971 3,614,295

INVENTORS.
GEORGE W. GILLEMOT
JOHN T. THOMPSON
BY
ATTORNEYS 3,614,295

CABLE SPLICE KIT AND METHOD OF USE IN MAKING BRANCHOUT SERVICE CONNECTIONS

This invention relates to cable splicing facilities and more particularly to an improved cable splice kit and method of use in making branchout connections to a main cable and featuring an auxiliary splice housing which can be opened and closed repeatedly without risk of injury to the main cable.

Telephone communication cables require branchout service connections at frequent intervals with provision for testing and changing or increasing communication channels. Opening the main cable involves the serious risk of damage or the admission of moisture.

By this invention there is provided a technique for splicing a short branchout service cable to conductors of the main cable via a permanently sealed splice. The other end of branchout cable, together with one end of a lead-in cable, is then sealed within one end of a two-part auxiliary splice housing constructed for ready access. The auxiliary splice comprises a pair of cup-shaped molded components arranged to be normally held together in telescoped assembly by a clamping band. The branchout and lead-in cables include electrical shielding secured in good conductive contact with one another by a fitting imbedded in potting compound filling the housing half into which the two cables extend. The larger of the two housing parts is preferably made of resilient nonconductive material and flexes readily to compensate for pressure differentials across its sidewall.

Accordingly, it is a primary object of the present invention to provide a cable splice kit and method for use in providing a main cable with a short branchout service cable equipped at its outer end with an accessible auxiliary splice.

Another object of the invention is the provision of a simple, inexpensive, reliable auxiliary splice housing for use between a main cable and a service lead-in cable which can be opened without hazard to the main cable when testing and making splice connections.

Another object of the invention is the provision of a simply constructed cable splice assembly comprising a pair of sub units held detachably assembled normally and readily separable to provide access to the splice proper for testing and servicing.

These and other more specific objects will appear upon reading the following specification and claims and upon considering in connection therewith the attached drawing to which they relate.

Figure 2:
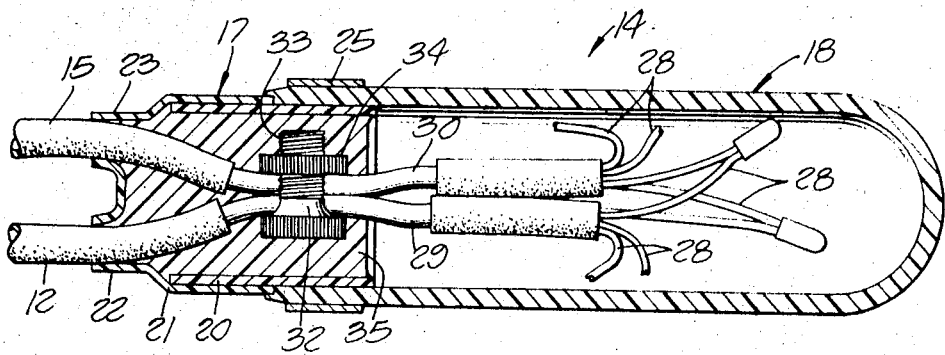

Referring now to the drawing in which a preferred embodiment of the invention is illustrated:

FIG. 1 is a view showing a main cable equipped with the invention branchout and auxiliary splice facility; and FIG. 2 is a cross-sectional view on an enlarged scale through the auxiliary splice per se.

Referring more particularly to FIG. 1, there is shown a typical installation of the invention comprising a main communication cable 10 having a permanently sealed branchout cable splice 11 for a short length of branchout cable 12. Cable 12 usually comprises a plurality of pairs of conductors each permanently spliced to a selected conductor of main cable 10. Cable 12 is relatively short and projects into one end of the invention auxiliary splice housing 14 closely beside a lead-in service cable 15 sufficiently long to extend to the premises and equipment to be serviced.

Referring now to FIG. 2, it will be understood that auxiliary splice housing 14 typically comprises two deep cup-shaped members 17, 18 of suitable nonconductive resilient material. As herein shown, the shorter half 17 is made in two parts including a short cylindrical length of plastic tubing 20 having a snug fit with a molded end cap 21. Members 20,21 may be bonded together or the two parts can be molded in one piece if desired. The bottom of the cup-shaped member 17 is formed with two tubular bosses 22,23 sized to have a snug fit with branchout cable 12 and lead-in cable 15.

The second cup-shaped half 18 of the splice housing has a snug telescopic fit over the protruding end of tubular member 20 and is normally held assembled thereto by a clamping band 25 of any suitable construction equipped with a threaded adjusting screw 26.

It will be understood that branchout cable 12 and lead-in cable 15 include a plurality of pairs of conductors 28 enclosed by a sheath of electrical shielding 29,30 underlying an outer protective insulation sheath. It is important that the shielding layer of cables 12 and 15 be securely anchored to one another in good electrical contact. This is readily accomplished in the present invention using a bolt fastener of the type shown in FIG. 2. This fastener comprises a bolt 32 having a deeply slotted threaded shank 33 supporting a nut 34 having a knurled rim. It will be understood that the deep slot is sized to have a snug fit about electric shielding 29,30 of each of cables 12 and 15. A short length of the insulation of each of these cables is removed over an area spaced rearwardly from the end of the insulation proper of these cables, as is clearly illustrated in FIG. 2. The cables are then assembled into the bolt slot and nut 34 is tightened against the sheath 30 of the adjacent one of the cables, thereby holding the two shields 29,30 pressed together between nut 34 and the inner end of the slot.

Anchorage of the cables within splice housing half 17 is assured by charging this housing member with potting compound 35. After completing the assembly of fasteners 32, 34 cables 12 and 15 are pulled outwardly through bosses 22 and 23 a short distance until the fastener 32 is located below the rim edge of member 17 and approximately in the position shown in FIG. 2. Compound 35 is then poured into member 17 while held upright and allowed to take a set. It will be understood that the potting compound is of any suitable composition forming a strong bond with the splice housing material and with the insulation of cables 12 and 15.

The conductor pairs 28 of the two cables may be spliced together in conventional manner at any time. Usually only a part of the conductors are spliced together, the remainder behind held in reserve for future expansion needs. Auxiliary splice housing 14 is normally maintained closed with the housing halves tightly clamped together except when testing and servicing the cables. To be noted is the fact that shielding 29,30 of each of the cables is exposed beyond the surface of potting compound 13 thereby facilitating checking the shielding of each cable for continuity.

The auxiliary splice kit includes all the components illustrated in FIG. 2 which are assembled in the manner described. Owing to the pliant and flexible character of the walls of housing member 18, splice facility 14 readily compensates for pressure changes between the interior of the splice and the ambient atmosphere. Accordingly, the pressure conditions interiorly of the housing remain in balance with those on the exterior thereby greatly minimizing the sealing problem between components 17, 18. Access to the auxiliary splice is obtained by the simple expedient of loosening clamping nut 26 of clamp 25 and then withdrawing the two halves from their assembled position. After completing a servicing operation the splice is reclosed and clamped in assembled position by tightening screw 26. As will be recognized, opening the auxiliary splice imposes no risk on main cable 10. Normally, auxiliary splice 14 is located closely adjacent the main cable for convenience in servicing the splice without need for entering upon the customer's property.

While the particular cable splice kit and method of use in making branchout service connections herein shown and disclosed in detail is fully capable of attaining the objects and providing the advantages hereinbefore stated, it is to be understood that it is merely illustrative of the presently preferred embodiments of the invention.

We claim:

1. A cable splice assembly for use in providing an accessible protective enclosure for a splice between a pair of cables each having a plurality of terminal ends of electrically shielded conductors, said assembly comprising: a cup-shaped member of nonconductive material having a pair of port means in the bottom thereof and having a snug fit with each one of a pair of shielded cables of conductors, an elongated tubular cap of nonconductive material having one open end which has a snug telescopic fit with the exterior sidewall of said cup-shaped member, releasable clamp means detachably securing said cap in a fluid tight manner with the side wall of said cup-shaped member, a threaded bolt of conductive material slotted lengthwise thereof and provided with a nut clamping an exposed length of the shielding of said pair of cables captive in said slotted bolt, and a potting compound filling said cup-shaped member to a depth substantially submerging said slotted bolt while leaving the terminal ends of said conductors accessible for splicing upon detaching said tubular cap from said cup-shaped member.

2. A reopenable splice assembly enclosing a pair of shielded electrical cables each having at least one pair of wires therein, said splice assembly comprising first and second deep cup-shaped members of nonconductive material having their open ends telescoped snugly together, clamping means embracing the telescoped sections of said first and second members and effective to hold the same detachably assembled in fluidtight manner, said first member having a plurality of tubular passages each having a snug fit with a separate one of said shielded cables inserted therethrough, a nut and a threaded slotted bolt of conductive material assembled transversely of an exposed length of shielding of a pair of shielded cables extending through said passages in the bottom of said first cup-shaped member clamping the shields thereof snugly against one another in an area spaced between the opposite ends of said first member, a potting compound substantially filling said first member with the split bolt submerged therein and anchoring and sealing the cables in assembled position through the bottom of said first member, and the terminal ends of the cable conductors being housed within the second of said members and accessible for splicing and testing upon loosening said clamp and separating said first and second members.

3. That method of providing a normally enclosed but accessible splice between a main cable of conductors provided with a series of service outlets at intervals therealong without need for access to the main cable or risk of exposing the interior thereof to the elements, said method comprising: providing a main cable at intervals with separate permanently sealed splice assemblies each having a short length of electrically shielded branchout service cable extending therefrom, providing the free end of said shielded branchout shielded service cable and the adjacent end of a service lead-in cable with a normally closed but openable fluidtight auxiliary splice housing formed in two cup-shaped halves sized to telescope over one another in opposed end-to-end relation, extending said branchout and lead-in cables through the bottom of one of said cup-shaped halves, securing the exposed shields of said cables in electrical contact with one another within the interior of said one cup-shaped half, anchoring the portions of said branchout and lead-in cables immediately inside said one cup-shaped half in place therein with potting compound, and the terminal ends of said branchout and lead-in cables housed within the other of said cup-shaped halves being exposed for splicing together and checking when the two halves of said housing are separated.

4. That method defined in claim 3 characterized in the stp of normally securing the cup-shaped halves of said auxiliary housing telescoped together in a fluidtight manner.

5. That method defined in claim 3 characterized in the step of utilizing a soft pliant nonconductive composition for the half of said auxiliary housing enclosing the terminal ends of said branchout and lead-in cables.

6. That method defined in claim 3 characterized in utilizing a relatively short rigid housing half in combination with a relatively long and pliant housing half the sidewalls of which flex and compensate for small-range variations between internal and external pressure.

7. That method defined in claim 3 characterized in the step of securing said exposed shields together by seating the same against one another at the inner end of an axially slotted bolt and tightening the bolt nut against said exposed cable shields, and embedding said slotted bolt and the adjacent portions of the cables clamped therein in said potting compound to safeguard the cable shields and to prevent the nut on said slotted bolt from loosening.

8. That method defined in claim 7 characterized in the steps of telescoping the open ends of said cup-shaped housing halves together, and clamping the overlapping ends of said housing halves together in a fluidtight manner with a clamping band located radially opposite portions of said potting compound.